Nov. 14, 1950        H. B. ROYSHER        2,529,664
VISUAL EDUCATIONAL PROJECTOR
Filed Feb. 14, 1948        3 Sheets-Sheet 1
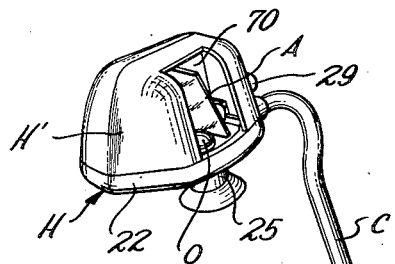
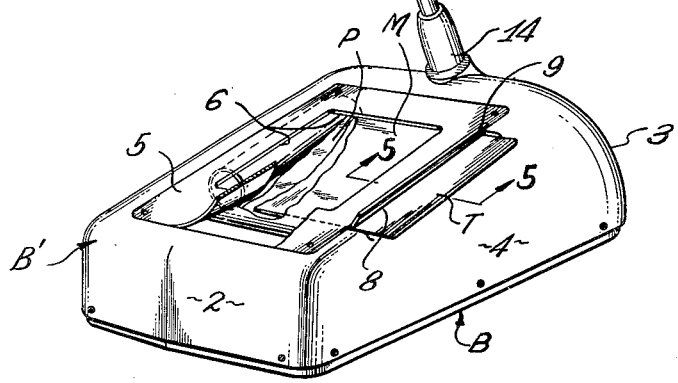
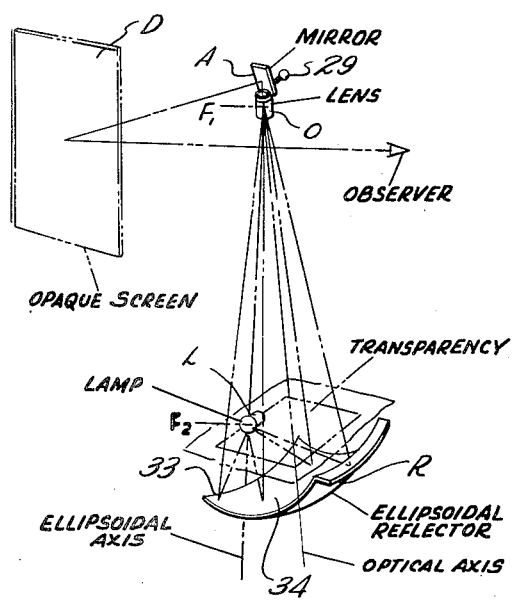
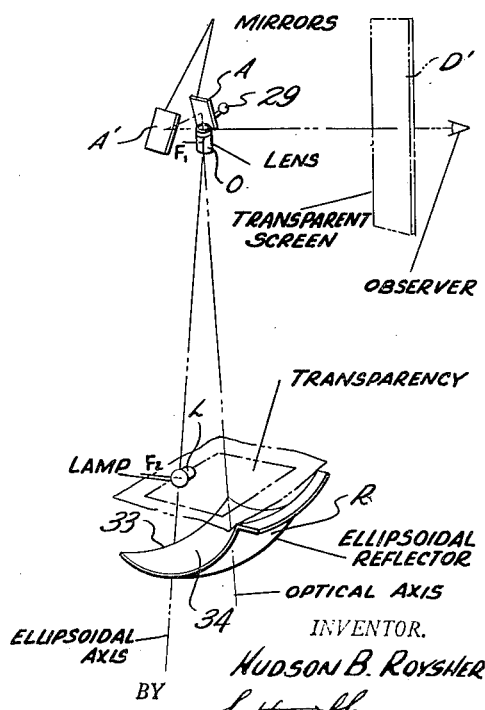
INVENTOR.
HUDSON B. ROYSHER
BY
Luther L. Mack
Attorney

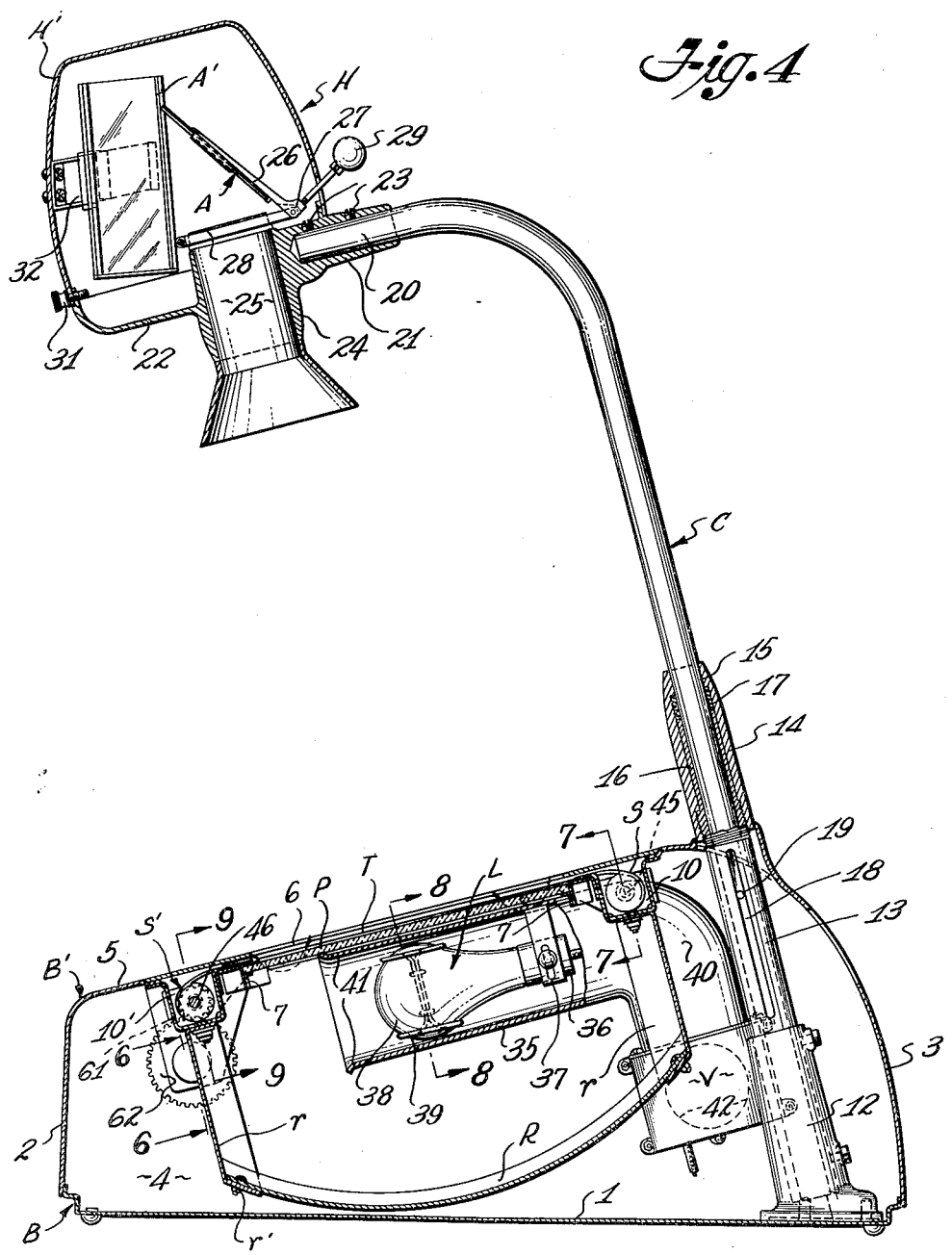

Nov. 14, 1950 — H. B. ROYSHER — 2,529,664
VISUAL EDUCATIONAL PROJECTOR
Filed Feb. 14, 1948 — 3 Sheets-Sheet 3
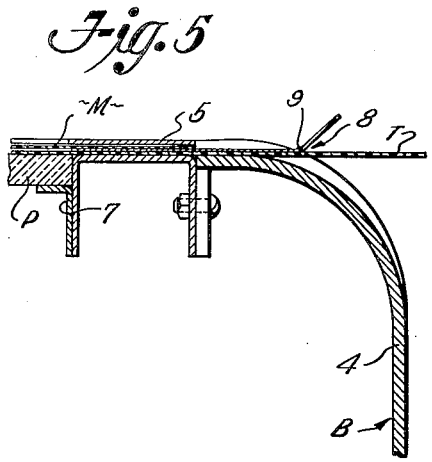
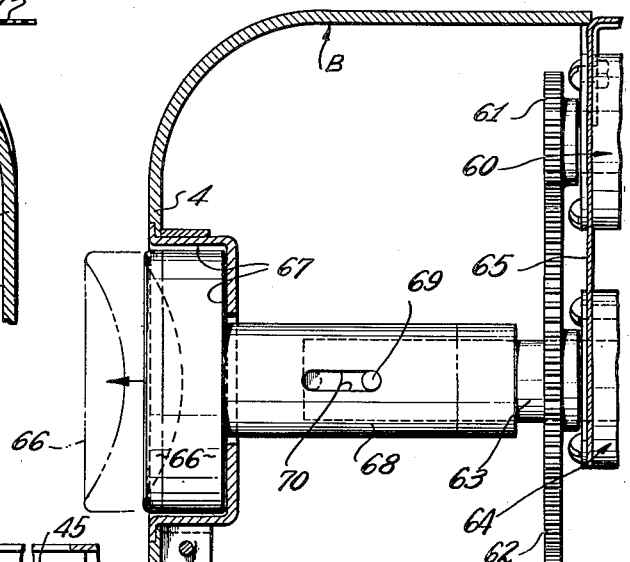
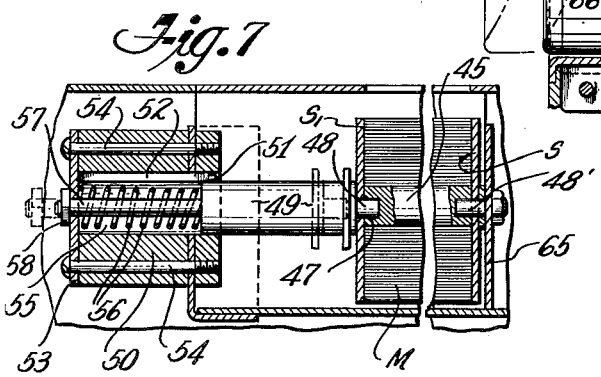
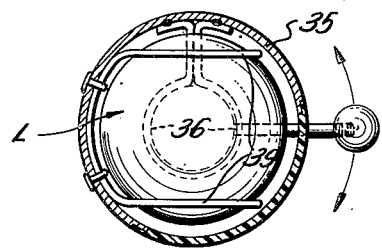
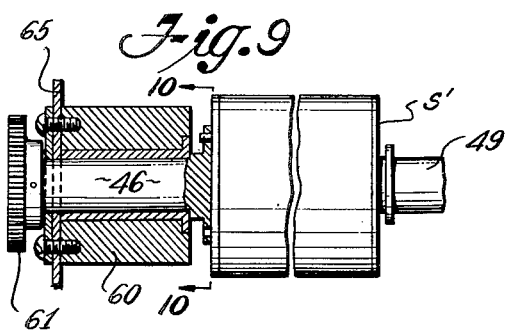
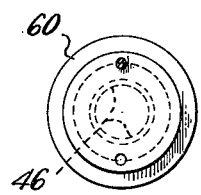
INVENTOR.
HUDSON B. ROYSHER
BY Luther L. Mack
Attorney Patented Nov. 14, 1950

2,529,664

UNITED STATES PATENT OFFICE 2,529,664

VISUAL EDUCATIONAL PROJECTOR

Hudson B. Roysher, Los Angeles, Calif., assignor to Ward Hickok, Beverly Hills, Calif.

Application February 14, 1948, Serial No. 8,385

7 Claims. (Cl. 88—24)

This invention relates to and has for an object the provision of an optical projector which is particularly adapted for use in connection with visual educational programs wherein instructions, writings, charts, diagrams, drawings, tabulated information, game scores, illustrations employed in connection with lectures, sermons, and discourses, as well as other informational and educational data may be projected upon the obverse side of a light transmitting screen or upon a surface as of a wall, panel or the like, or optionally through a screen, for rendering the projected matter, viewable by an audience, selectively on the obverse or reverse sides of a screen, as occasion may require.

In the development of a projector embodying this invention, it has been found desirable and is an object to provide a simplified but highly effective structure and arrangement of new and old elements which are conducive to faithful reproduction of the subjective images, free of marginal or areal distortion and abounding in requisite light and its distribution over the effective area of image receiving surfaces of suitable but frequently different character.

An object is to provide a convenient and readily adjustable projection unit including a base for supporting all of the component projection elements of a system except the screen but including a platen adapted at least at times to support a transparency bearing forms, tabulations or spaces therefor, and a transparent sheet of material covering the transparency in such a manner that sections thereof may be moved into and held in position for receiving written notations by an instructor, lecturer, or the like, for projection, together with matter on the transparency, upon a suitable surface for viewing by an audience.

An important object is to provide an adjustable optical unit above the platen for receiving reflected light from a reflector mounted below the platen and for projecting the reflected light upon a surface. For such purpose a reflector is provided which has the form of a segment of an ellipsoid so disposed on the base relative to a light source and the optical elements above the platen that light from the source will be divergingly received and convergingly reflected from a surface to a focal point of the projecting lens of the optical system.

A further object is to provide in the optical system of a projector a reflector of such form and character that it will serve not only to gather and reflect a maximum of light but which will also serve as a condenser, thereby eliminating the necessity for the employment of conventional condenser lenses.

A still further object is to provide a projecting unit so arranged that light may be projected forwardly, laterally and diagonally from a light source to and upon an image receiving surface or therethrough, selectively, to meet varying conditions of use.

Other objects will appear as the description progresses.

There is illustrated in the accompanying drawings a preferred form of projector embodying the hereinbefore mentioned improvements, subject, however, to modification, within the scope of the appended claims, without departing from the spirit of the invention. In said drawings:

Fig. 1 is a perspective view of an assembled projector, partly broken away in the vicinity of the platen to show certain elements more clearly than otherwise;

Figs. 2 and 3 are, respectively, somewhat similar optical diagrams arranged for opaque and transparent projection for viewing an image on the obverse and reverse sides of a screen;

Fig. 4 is a vertical sectional elevation of the projector in the plane of a median longitudinal line of the base;

Fig. 5 is a fragmentary section of the base on line 5—5 of Fig. 1;

Figs. 6, 7, 8 and 9 are fragmentary sections of the same on lines 6—6, 7—7, 8—8 and 9—9 of Fig. 4, respectively;

Fig. 10 is a transverse view on line 10—10 of Fig. 9 of a portion of the mechanism adjustably moving a section of transparent material into writing position on the platen preparatory to a projection operation.

Briefly described, the projector includes a base B within which is housed a reflector R, a lamp L and a ventilating unit generally indicated at V. Base B has a bottom 1, a detachable cover B' having front panel 2, a rear detachable closure 3, sides 4, 4, and a top 5 provided with a light aperture 6 in registration with reflector R. A platen P, preferably of thick glass, is suspended from top 4 on cleats 7, 7 at opposite margins so that the margins of aperture 5 will slightly overlie the marginal portions of the platen. Space is provided between platen P and top 5 for the lateral insertion of suitable transparent sheets T through a slot 8 at one side of the top beneath an upwardly inclined guide 9 so that informational and educational matter borne by the transparencies may rest upon the upper side of the platen when the sheets are in registration with aperture 6.

Adjacent opposite margins of the aperture 6, spools S and S' are detachably and rotatably mounted in transverse channels 10 and 10', respectively, for adjustably supporting and feeding successive sections of a roll of transparent material M the transparencies T, whereby notations, sketches, writings, calculations and other matter may be formed for simultaneous projection with the data, markings, etc., on the transparencies T. The spools S and S' and their operation will be hereinafter described in detail.

Except for reflector R and lamp L, all other elements of the optical system are mounted on a head H which is adjustably supported on base B by means of a column C in the following manner. Base B carries a fitting 12 secured to bottom 1 and adapted to slidably receive a tubular member 13 onto the upper end of which an extension 14 is screwed. Extension 14 is bored at 15 to slidably receive the leg of column C and of greater diameter at 16 so that a frictional gasket 17 of leather or the like may be inserted in bore 16 around column C and thus serve to hold the column frictionally in adjusted position on the column support. Fitting 13 has a peripheral slot 18 elongated so as to adjustably receive a pin 19 extended from column C and into said slot, thereby preventing rotation of the column on its support.

Column C is bent at right angles to form an arm 20 which is secured to a telescoping boss 21 formed on the base 22 of head H as by means of set screws 23, or otherwise. Head H has a sleeve 24 on its base bored to receive the barrel 25 of an objective lens system and serves to hold the lens or lenses in focal alinement with reflector R so that light from the reflector will be directed through platen P, transparency T, sheet M and aperture 6 to and thence through and from the objective lens O by means hereinafter described upon an image receiving surface.

To such end head H includes a primary mirror A held on a frame 26 which is pivotally attached at a point 27 to a constrictable band 28 encircling the upper portion of lens barrel 25. A handle 29 is affixed to frame 26 for tiltably adjusting mirror A and also serves to rotate the mirror on barrel 25 so as to selectively adjust the mirror for projecting light in any desired direction and at a desired angle.

Head H also includes a hood H' which is detachably carried on base 22 and held as by screws 31. Said hood supports a secondary mirror A' which is adjustable on a fixture 32 relative to mirror A. Mirror A' is required for reversing the projected image for viewing from the reverse side of a transparent screen D' as shown in Fig. 3, but is not necessary when the image is projected onto the obverse side of an opaque screen D, as shown in Fig. 2.

As shown in Figs. 2, 3 and 4, the reflector R is formed of a segment of an ellipsoid with its concave surface forming a reflector. The reflector is tilted to such an extent that its innermost margin 33 lies in the perpendicular plane of the focal point of objective lens O, while the image plane and the focal point of the reflector are coaxial, and the image plane, objective O and mirrors A and A' are tilted to correspond to the inclination of the reflector. Reflector R is suitably suspended from cover B' by means of brackets r, r, secured to the marginal portions of the reflector as by screw r', as shown in Fig. 4.

Lamp L is mounted at one side of the base in a position above but laterally offset from the reflector R so that said lamp is not in the path of reflected light and serves to divergingly direct light to the reflecting surface 34 of the reflector while the reflector convergingly reflects light rays to the objective O and condenses the light sufficiently to eliminate the necessity for conventional condenser lenses common to some optical projectors. Lamp L is supported in an arcuate member open at its periphery to an extent that all of the lights therefrom will be directed upon the surface 34 of the reflector. Said lamp may be supported at its terminal end 36 by means of a suitable clamp 37 and additionally at its bulb 38 by a spring wire holder of the character shown in Fig. 4, or otherwise.

The ventilating unit V includes a motor driven fan and an air duct 40 leading from an air inlet 41 to the interior of support 35 so that a flow of cold air may be induced from left to right, as shown in Fig. 4, to and through the motor-fan housing and exhausted through an outlet 42 in rear closure 3 of the base. Thus, cool air flowing past the lamp prevents undue heating of the base.

The transparent sheet of material is applied to and supported on the top 5 of base B by means of specially designed spools S and S' which have parallel axes 45 and 46, respectively, disposed in a common inclined plane and extend transversely of the base, as shown in Fig. 4. Spool S is arranged to support a roll of transparent material in sheet form of a width approximating that of the aperture 6 while spool S' is arranged to receive the material unwound from spool S. Either one or both of said spools are removably supported on the base as by means of special supports which are illustrated in Fig. 7. Preferably one of said supporting devices is employed at an end of each spool and while serving as a bearing for a spool spindle is also axially yieldable to permit the ready insertion and withdrawal of the spool associated therewith.

For instance, as in Fig. 7, spool S has its spindle 45 bored at 47 to receive a pilot trunnion 48 axially extended from the inner end of a short shaft 49 which is longitudinally slidable in a fixed bearing 50 supported on base B. Shaft 49 is held against rotation by means of a pin 51 slidable in a slot 52 of bearing 50, or otherwise. Thus, spool S rotates on trunnion 48 for unwinding the sheet of material therefrom for use.

Bearing 50 has a cover plate 53 secured to the outer end thereof and by means of screws 54 as is centrally bored at 55 to receive a compression spring 56. Said spring is coiled around a reduced stem 57 extended from shaft 49 and through plate 53 and held by a nut 58. Thus, spring 56 is compressed between the enlarged shaft 49 and plate 53 and tends to urge trunnion 48 into its seat 47 of spindle 45, but allows the removal of spool S from the shaft when the spring 56 is compressed sufficiently to withdraw the spool spindle from a bearing at its opposite end of the character shown in Fig. 9, or otherwise.

Referring to the spool mounting of Fig. 9, one or both of the spools may have a yieldable bearing at one end and a fixed bearing 60 at its other end, the spool S' in this figure showing a connection with a shaft 49 at its right hand end and a fixed bearing 60 at its left hand end adapted to rotatably receive spindle 46. In this case, however, a gear 61 is fixed to spindle 46 at a point adjacent the inner side 4 of base B for operative engagement with a larger gear 62 fixed to a spindle 63 journalled in a bearing 64, bearings 60 and 64 being supported on a wall or partition 65, as shown in Fig. 6.

An operating knob 66 is rotatably held in a recess 67 formed in a side wall 4 of the base and has an extension 68 telescoping spindle 63 and rotatably connected with but adjustable on said spindle as by means of a pin 69 slidably engaging a slot 70 in extension 68. Thus, handle 66 may be pulled outwardly from its recess 67 for rotating gear 62 and through gear 62 for operating spool S' in order to unwind sheet material from spool S and wind the same onto spool S'. Friction between a flange $S_1$ of spool S and the adjacent end of shaft 49 serves to prevent slack in the material M as it is disposed over the element T and platen P with its lateral edges underlying the marginal portions of top 5 so that the material will be held taut and flatwise on the platen while an instructor is writing thereon.

If desired, as shown in Fig. 7, the opposite end of a spool S or S' from the yieldable bearing may be held on a short fixed trunnion 48' carried by member 65 or another suitable portion of the frame.

It may be noted that the base B may be formed as shown in Fig. 4, with bottom portion 1 and a separable cover including ends 2 and 3, sides 4, 4 and top 5 integral and suitable frame sections carried by the bottom and cover and arranged so that the cover may be readily attached to and detached from the bottom. The interior of the base, of course, is finished in black throughout so as to eliminate glare and reflection from bright parts.

In operation, if it is desired to project upon an opaque surface such as a wall or the obverse side of a screen D, as in Fig. 2, the secondary mirror is removed from head H, the column C and head H thereon are adjusted together with primary mirror A so as to properly establish the projection area on screen D by energizing lamp L and projecting light therefrom to and from reflector R, through aperture 6, objective O, to and from mirror A to screen D. Mirror A is independently adjustable on its axis 27 by means of handle 29 to a suitably inclined position for projecting the reflected light to the projection area of screen D.

A desired transparent image form T is then inserted through slot 8 into projecting position on the upper surface of transparent platen P, following which spool S loaded with a roll of transparent material M is positioned operatively in its channel 10 and the material M is unwound therefrom and moved over transparency T and fixed to spool S'. Thus, the section of material M overlying the transparency T is positioned in such manner and firmly held that it may be written upon by an operator to form calculations, writings, tabulations, etc., for projection simultaneously with fixed matter borne by sheets T. Or, scores, notations, etc., may be projected as written directly on the sections of sheet M in the absence of form sheets T and projected on the screen for observation either after or during the writing thereof.

The machine is similarly set and operated for projection of images through a screen, as at D' in Fig. 3, for viewing the images on the reverse side of the screen, except that in such case the secondary mirror A' is employed for re-reflecting and reversing the image on reflector A and directing the light through a lateral opening 70 in hood H' to and through screen D'. It may be noted that hood H' is removed from the head when only mirror A is used but is attached to the head when both mirrors A and A' are used.

It will be readily understood from the foregoing description of the structure and operation of the disclosed projector that it is designed for producing maximum efficiency in the simplest possible manner. The projected images are faithful reproductions of their originals, without distortion, and alien glare, and with clarity of detail such as is not usually provided with other conventional projectors for the same or other purposes.

The subjective transparent sheets T may be printed typographically or photographically so as to bear fixed images. The form of cross rulings for tabulating data, written inserts, pictures, background scenes, and other matter which when combined with the superposed notations, calculations, legends, drawings, etc., personally applied to the transparent sheet M by an instructor, presents on an appropriate image receiving surface of a wall or screen a composite image of the fixed (pre-written or prepared) and the manually applied matter. In fact, the manually applied matter becomes visible to observers as it is being written or otherwise applied. Section after section of the material M may be used as the spool S is intermittently rotated by knob 67 and thereafter filed for further use when desired. Or, by use of a special type of stylus or grease pencil, markings on sections of material may be erased and the same sections of material used again and again.

Usually, for instructional use and frequently for exhibitional use, libraries of pre-written form sheets T are maintained so that all sheets in the same topical groups may be retained in a desired order of their use.

In the use of optical projectors of the same general character as that disclosed herein, it has been found difficult if not quite impossible to provide at the image field a requisite quantum of light from a source except by employing lamps of excessive energy consuming character, thereby increasing cost of operation and generation of heat beyond reasonable, comfortable and convenient limits. Even so, in such cases much of the effective light is lost between its source and the final image field, due to improper refraction, reflection, concentration and diffusion.

For instance, not all of the light from a source is caught by a reflector behind the light source and transmitted to and through the objective unit to the image field, nor, when a condenser lens system is introduced between a light source, with or without a reflector, is the projected quantum of light at a maximum or even a requisite point with relation to the energy consumed for producing the light.

In the instant invention there is provided means for overcoming the aforesaid faults by reason of the following facts:

The reflector R being of ellipsoidal form serves to receive a maximum quantum of light from a source and to reflect the light with minimum loss convergingly to the focal point of the objective and to project the light to a primary reflector embodied in the optical system from which it is reflected upon an image field; or, after leaving the primary reflector, the light may be transmitted to a secondary reflector and therefrom to the image field, depending upon whether the image is to be viewed on the obverse or reverse side of a screen, the secondary reflector serving to reverse the image in the latter case.

The main reflector R serves to both reflect and condense the light and eliminates necessity for usual condenser lenses.

The light source being mounted in a laterally offset position from the focal axis of the reflector can not interfere with he reflected light and avoids possibility of glare spots and counter reflections such as are frequently present when the light source is positioned between the reflector and the image plane.

The reflector R being tilted so that its focal axis leans away from a perpendicular plane touching a margin of the reflector and the focal point of the objective, serves to receive the diverging light rays from the offset light source and reflect them convergingly to the objective, thereby intensifying the light at a point of maximum necessity and efficiency.

Therefore, when a maximum quantum of light is obtainable at a focal point of projection, the only appreciable loss of light in a projection operation can and will occur between the objective and the image field through unrestrained dissipation, and the resultant projected images on reasonably enlarged fields will be presented for observation with fidelity and clarity, the size of the image field being dependent upon the distance of the field from the objective and the focal length of the objective. Such results are capable of accomplishment through the employment of the system herein described and its component elements, and a minimum consumption of energy at the light source.

I claim:

1. An optical projector comprising: a base; an ellipsoidal reflector carried by the base; a light source on the base offset from the focal axis of the reflector; a transparent platen on the base and disposed in a plane at a right angle to the focal axis of the reflector for supporting a light transmitting image bearer, there being an aperture in the base adjacent the platen and image bearer; and a head extended from said base including an objective unit and reflecting means focally alined with the ellipsoidal reflector for receiving light from the ellipsoidal reflector and projecting the same upon an image receiving surface.

2. An optical projector comprising: a base; an ellipsoidal reflector carried by the base; a light source on the base offset from the focal axis of the reflector; a transparent platen on the base and disposed in a plane at a right angle to the focal axis of the reflector for supporting a light transmitting image bearer, there being an aperture in the base adjacent the platen and image bearer; and a head extended from said base including an objective unit and reflecting means focally alined with the ellipsoidal reflector for receiving light from the ellipsoidal reflector and projecting the same upon an image receiving surface, said ellipsoidal reflector adapted to receive light from said source and to converge and solely serving to condense the reflected light at the objective.

3. An optical projector comprising: a base; a concave reflector carried by the base; a light source on the base offset from the focal axis of the reflector; a transparent platen on the base and disposed in a plane at a right angle to the focal axis of the reflector for supporting a light transmitting image bearer, there being an aperture in the base adjacent the platen and image bearer; a head extended from said base including an objective unit and reflecting means focally alined with the concave reflector for receiving light from the concave reflector and projecting the same upon an image receiving surface; and means for supporting said concave reflector in an inclined position with a margin thereof coinciding with the optical axis so that light from said offset source will be distributed upon and over the reflecting surface.

4. An optical projector comprising: a base; a concave reflector carried by the base; a light source on the base offset from the focal axis of the reflector; a transparent platen on the base and disposed in a plane at a right angle to the focal axis of the reflector for supporting a light transmitting image bearer, there being an aperture in the base adjacent the platen and image bearer; a head extended from said base including an objective unit and reflecting means focally alined with the concave reflector for receiving light from the concave reflector and projecting the same upon an image receiving surface; and means for adjusting said head on said base into and out of focus with the concave reflector.

5. An optical projector comprising: a base; a concave reflector carried by the base; a light source on the base offset from the focal axis of the reflector; a transparent platen on the base and disposed in a plane at a right angle to the focal axis of the reflector for supporting a light transmitting image bearer, there being an aperture in the base adjacent the platen and image bearer; and a head extended from said base including an objective unit and reflecting means focally alined with the concave reflector for receiving light from the concave reflector and projecting the same upon an image receiving surface, the reflecting means of said head comprising primary and secondary reflectors selectively operative for projecting a reflected image upon the obverse and reverse sides of an image receiver.

6. A projection apparatus comprising: a base formed with a transparent image supporting platen at its top, an objective unit supported on the base and spaced above the platen, an ellipsoidal reflector of substantially rectangular outline mounted on the base with a margin thereof in focal alinement with the axis of the objective unit, a light source on the base mounted outwardly of the path of reflected light, and a reflector carried by and coaxially adjustable relative to the objective unit for directing projecting light from said source in a desired direction, said objective reflector being also inclinably adjustable for regulating the elevation of the projected light field on a receiving surface.

7. A projection apparatus comprising: a base formed with a transparent image supporting platen at its top; an objective unit supported on the base and spaced above the platen; an ellipsoidal reflector of substantially rectangular outline mounted on the base with a margin thereof in focal alinement with the axis of the objective unit; a light source on the base mounted outwardly of the path of reflected light; a reflector carried by and coaxially adjustable relative to the objective unit for directing projecting light from said source in a desired direction, said objective reflector being also inclinably adjustable for regulating the elevation of the projected light field on a receiving surface; and an auxiliary reflector positioned between the objective reflector and the projection field and independently adjustable for reversing the image when the light is projected through a screen.

HUDSON B. ROYSHER.

REFERENCES CITED

The following references are of record in the file of this patent:

UNITED STATES PATENTS

| Number | Name | Date |
|---|---|---|
| 1,763,630 | Hopkins | June 10, 1930 |
| 1,919,922 | Baker et al. | July 25, 1933 |
| 1,984,004 | Wildhaber | Dec. 11, 1934 |
| 2,168,137 | Porter | Aug. 1, 1939 |
| 2,181,134 | Katz | Nov. 28, 1939 |
| 2,210,333 | Kroner | Aug. 6, 1940 |
| 2,250,174 | Bancroft | July 22, 1941 |
| 2,342,115 | Blauvelt | Feb. 22, 1944 |
| 2,381,260 | Coker | Aug. 7, 1945 |